(12) United States Patent
Shibata et al.

(10) Patent No.: US 7,980,059 B2
(45) Date of Patent: Jul. 19, 2011

(54) EXHAUST GAS PURIFICATION SYSTEM FOR INTERNAL COMBUSTION ENGINE

(75) Inventors: Daisuke Shibata, Numazu (JP); Hiroshi Sawada, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 611 days.

(21) Appl. No.: 12/097,072

(22) PCT Filed: Dec. 14, 2006

(86) PCT No.: PCT/JP2006/325442
§ 371 (c)(1),
(2), (4) Date: Jun. 12, 2008

(87) PCT Pub. No.: WO2007/069780
PCT Pub. Date: Jun. 21, 2007

(65) Prior Publication Data
US 2009/0229253 A1 Sep. 17, 2009

(30) Foreign Application Priority Data
Dec. 15, 2005 (JP) .................................. 2005-361374

(51) Int. Cl.
*F01N 3/00* (2006.01)

(52) U.S. Cl. ................ 60/277; 60/285; 60/287; 60/297; 60/301

(58) Field of Classification Search .................... 60/276, 60/277, 285, 287, 288, 295, 297, 301
See application file for complete search history.

(56) References Cited

U.S. PATENT DOCUMENTS

| 5,201,802 | A | | 4/1993 | Hirota et al. |
| 5,693,877 | A | | 12/1997 | Ohsuga et al. |
| 5,713,199 | A | * | 2/1998 | Takeshima et al. ............. 60/276 |
| 5,987,883 | A | | 11/1999 | Schneider |
| 6,151,888 | A | | 11/2000 | Schneider et al. |
| 6,389,802 | B1 | * | 5/2002 | Berger et al. ................... 60/274 |

(Continued)

FOREIGN PATENT DOCUMENTS
EP     0 498 598     8/1992

(Continued)

OTHER PUBLICATIONS

Database WPI Week 200009, XP-002563838, dated Jan. 21, 2010.

(Continued)

*Primary Examiner* — Binh Q Tran
(74) *Attorney, Agent, or Firm* — Finnegan, Henderson, Farabow, Garrett & Dunner, LLP (57) ABSTRACT

An object is to estimate the degree of deterioration of an NOx catalyst with improved accuracy in an exhaust gas purification system having the NOx catalyst provided in an exhaust passage. According to the present invention, an NOx sensor is provided downstream of an NOx catalyst, and the difference between an estimated value of the NOx concentration in the exhaust gas in the exhaust passage upstream of the NOx catalyst and a detection value of the NOx sensor at a time when NOx in the exhaust gas is not removed in the NOx catalyst is calculated. In addition, in estimating the degree of deterioration of the NOx catalyst, the estimated value of the NOx concentration in the exhaust gas in the exhaust passage upstream of the NOx catalyst is corrected based on this difference, and the degree of deterioration of the NOx catalyst is estimated based on the difference between this corrected value and the detection value of the NOx sensor.

4 Claims, 6 Drawing Sheets

U.S. PATENT DOCUMENTS

| | | | |
|---|---|---|---|
| 6,487,849 B1 * | 12/2002 | Bidner et al. | 60/274 |
| 6,658,841 B2 * | 12/2003 | Beer et al. | 60/286 |
| 7,150,144 B2 * | 12/2006 | Nakagawa et al. | 60/277 |
| 2003/0163987 A1 | 9/2003 | Schnaibel et al. | |

FOREIGN PATENT DOCUMENTS

| | | |
|---|---|---|
| JP | 7-208151 | 8/1995 |
| JP | 10-68314 | 3/1998 |
| JP | 2888124 | 2/1999 |
| JP | 11-294149 | 10/1999 |
| JP | 2001-32745 | 2/2001 |
| JP | 2004-504539 | 2/2004 |

OTHER PUBLICATIONS

Extended European Search Report for EP Appl. No. 06842961.2, mailed Jan. 29, 2010.

* cited by examiner

EXHAUST GAS PURIFICATION SYSTEM FOR INTERNAL COMBUSTION ENGINE

CROSS-REFERENCE TO RELATED APPLICATIONS

This application is a national phase application of International Application No. PCT/JP2006/325442, filed Dec. 14, 2006, and claims the priority of Japanese Application No. 2005-361374, filed Dec. 15, 2005, the content of both of which is incorporated herein by reference.

TECHNICAL FIELD

The present invention relates to an exhaust gas purification system for an internal combustion engine having an NOx catalyst provided in an exhaust passage.

PRIOR ART

There are exhaust gas purification systems for an internal combustion engine that have an NOx catalyst such as an NOx storage reduction catalyst or an NOx selective reduction catalyst.

Japanese Patent Application Laid-Open No. 7-208151 describes a technology of providing, in such an exhaust gas purification system for an internal combustion engine, an NOx sensor provided downstream of an NOx catalyst to detect the NOx concentration in the exhaust gas and determining whether the NOx catalyst is deteriorated or not based on the temporal change in the NOx concentration detected by the NOx sensor. Japanese Patent Application Laid-Open No. 2001-32745 also describes a technology pertaining to determination of deterioration of an NOx catalyst.

DISCLOSURE OF THE INVENTION

An object of the present invention is to provide a technology that enables to determine the degree of deterioration of an NOx catalyst with improved accuracy in an exhaust gas purification system for an internal combustion engine having the NOx catalyst provided in an exhaust passage.

According to the present invention, an NOx sensor is provided downstream of an NOx catalyst in an exhaust passage. In addition, the difference between an estimated value of the NOx concentration in the exhaust gas in the exhaust passage upstream of the NOx catalyst and the detection value of the NOx sensor at a time when removal of NOx in the exhaust gas is not performed in the NOx catalyst is calculated. Then, based on this difference, correction of the estimated value of the NOx concentration in the exhaust gas in the exhaust passage upstream of the NOx catalyst that is to be used in estimating the degree of deterioration of the NOx catalyst is performed.

More specifically, an exhaust gas purification system for an internal combustion engine according to the present invention comprises:

an NOx catalyst provided in an exhaust passage of an internal combustion engine to remove NOx in exhaust gas;

an NOx sensor provided in said exhaust passage downstream of said NOx catalyst to detect the NOx concentration in the exhaust gas;

NOx concentration estimation means for estimating the NOx concentration in the exhaust gas in said exhaust passage upstream of said NOx catalyst based on an operation state of said internal combustion engine;

deterioration degree estimation means for estimating the degree of deterioration of said NOx catalyst based on a difference between a detection value of said NOx sensor and an estimated value by said NOx concentration estimation means at a time when said NOx catalyst is in an active state and the exhaust gas is flowing through said NOx catalyst; and NOx unremoved condition determination means for determining whether or not an NOx unremoved condition as a condition under which the exhaust gas reaches said NOx sensor with NOx in the exhaust gas not being removed in said NOx catalyst is met, wherein the estimated value of the NOx concentration by said NOx concentration estimation means in estimating the degree of deterioration of said NOx catalyst by said deterioration degree estimation means is corrected based on the difference between the detection value of said NOx sensor and the estimated value by said NOx concentration estimation means at a time when it is determined by said NOx unremoved condition determination means that the NOx unremoved condition is met.

While the exhaust gas reaches the NOx sensor with NOx in the exhaust gas not being removed in the NOx catalyst, the NOx concentration in the exhaust gas in the exhaust passage upstream of the NOx catalyst (which will be hereinafter referred to as the upstream NOx concentration) and the NOx concentration in the exhaust gas in the exhaust passage downstream of the NOx catalyst (which will be hereinafter referred to as the downstream NOx concentration) have substantially equal values.

Therefore, the upstream NOx concentration can be estimated with improved accuracy by correcting the estimated value of the upstream NOx concentration in estimating the degree of deterioration of the NOx catalyst, based on the difference between the detection value of the NOx sensor and the estimated value of the upstream NOx concentration by the NOx concentration estimation means at a time when the NOx unremoved condition is met.

In addition, by estimating the degree of deterioration of the NOx catalyst based on the difference between the estimated value of the upstream NOx concentration corrected as above and the detection value of the downstream NOx concentration detected by the NOx sensor at a time when the NOx catalyst is in an active state and the exhaust gas is flowing through the NOx catalyst, the degree of deterioration of the NOx catalyst can be estimated with improved accuracy.

Furthermore, according to the present invention, the degree of deterioration of the NOx catalyst can be estimated with improved accuracy without further providing an NOx sensor in the exhaust passage upstream of the NOx catalyst.

In the present invention, when the NOx catalyst is in an unactivated state, NOx in the exhaust gas will slip through the NOx catalyst. In view of this, it may be determined that the NOx unremoved condition is met if the temperature of the NOx catalyst is lower than an activation temperature.

In the present invention, a bypass passage one end of which is connected to the exhaust passage upstream of said NOx catalyst and the other end of which is connected to the exhaust passage downstream of the NOx catalyst and upstream of the NOx sensor and exhaust gas flow path control means for performing a control to cause the exhaust gas to flow either through the bypass passage or through the NOx catalyst may further be provided.

In this case, when the exhaust gas is caused to flow through the bypass passage, NOx in the exhaust gas is not removed in the NOx catalyst. In view of this, it may be determined that the NOx unremoved condition is met if the exhaust gas is caused by the exhaust gas flow path control means to flow through the bypass passage.

BEST MODE FOR CARRYING OUT THE INVENTION

In the following, a specific embodiment of the exhaust gas purification system for an internal combustion engine according to the present invention will be described with reference to the drawings.

Embodiment 1

Figure 1:
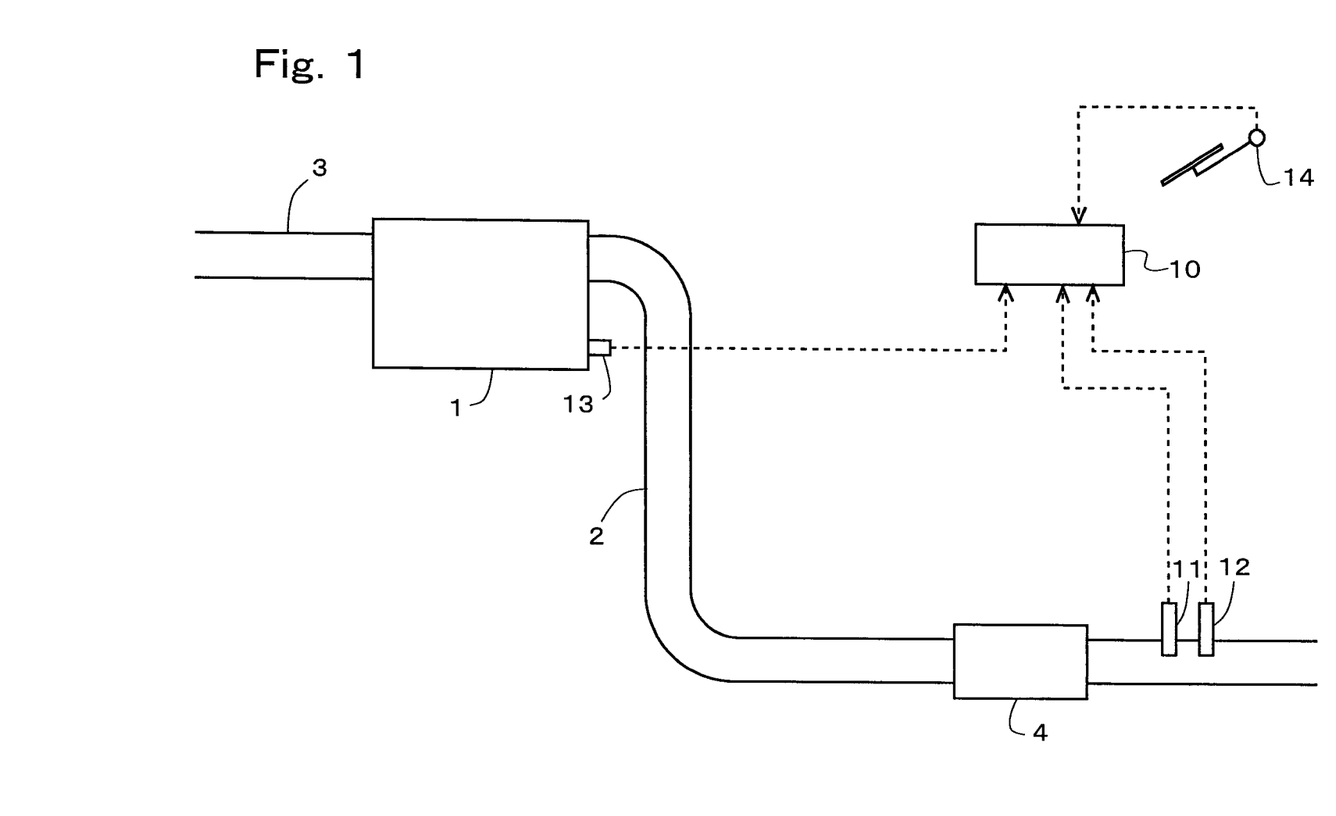
FIG. 1 is a diagram showing the general structure of an air intake and exhaust system of an internal combustion engine according to embodiment 1.

General Structure of Air Intake and Exhaust System of Internal Combustion Engine Here, a description will be made of a case in which the present invention is applied to a diesel engine for driving a vehicle by way of example. FIG. 1 is a diagram showing the general structure of an air intake and exhaust system of an internal combustion engine according to this embodiment.

The internal combustion engine 1 is a diesel engine for driving a vehicle. To this internal combustion engine 1 are connected an intake passage 3 and an exhaust passage 2. The exhaust passage 2 is provided with an NOx storage reduction catalyst 4 (which will be simply referred to as NOx catalyst, hereinafter). The NOx catalyst 4 is a catalyst that stores NOx in the exhaust gas when the ambient atmosphere is an oxidizing atmosphere, while discharges and reduces the stored NOx when the ambient atmosphere is a reducing atmosphere. In this embodiment, the NOx catalyst 4 may be replaced by an NOx selective reduction catalyst.

A temperature sensor 11 that detects the temperature of the exhaust gas and an NOx sensor 12 that detects the NOx concentration in the exhaust gas are provided in the exhaust passage 2 downstream of the NOx catalyst 4.

To the internal combustion engine 1 having the above described structure is annexed an electronic control unit (ECU) 10 for controlling the internal combustion engine 1. The ECU 10 is electrically connected with the temperature sensor 11, the NOx sensor 12, a crank position sensor 13 and an accelerator opening degree sensor 14. The crank position sensor 13 outputs an electrical signal indicative of the rotational angle of the crankshaft of the internal combustion engine 1, and the accelerator position sensor 14 outputs an electrical signal indicative of the accelerator opening degree of the vehicle on which the internal combustion engine 1 is mounted. The output signals of the sensors are input to the ECU 10.

The ECU 10 estimates the temperature of the NOx catalyst 4 based on the detection value of the temperature sensor 11. The ECU 10 calculates the rotation speed of the internal combustion engine 1 based on the detection value of the crank position sensor 13, and calculates the load of the internal combustion engine 1 based on the detection value of the accelerator opening degree sensor 14.

<Method of Estimating the Degree of Deterioration of NOx Catalyst>

Here, a method of estimating the degree of deterioration of the NOx catalyst according to this embodiment will be described. The higher the degree of deterioration of the NOx catalyst 4 becomes, the lower the NOx removing ability thereof becomes, namely the lower the NOx storage ability in the active state becomes. Therefore, the higher the degree of deterioration of the NOx catalyst 4 becomes, the smaller the difference (which will be hereinafter referred to as the NOx concentration difference) between the upstream NOx concentration defined as the NOx concentration in the exhaust gas in the exhaust passage 2 upstream of the NOx catalyst 4 and the downstream NOx concentration defined as the NOx concentration in the exhaust gas in the exhaust passage 2 downstream of the NOx catalyst 4 becomes. From this follows that the degree of deterioration of the NOx catalyst 4 can be estimated based on the NOx concentration difference.

In this embodiment, since the NOx sensor 12 is provided downstream of the NOx catalyst 4 in the exhaust passage 2, the downstream NOx concentration can be detected by the NOx sensor 12.

In addition, in this embodiment, the relationship between the load and rotation speed of the internal combustion engine 1 and the upstream NOx concentration has been obtained in advance by, for example, experiments, and the relationship has been stored in the ECU 10 as a map. Thus, the upstream NOx concentration is estimated based on this map. In the following, this map will be referred to as the upstream NOx concentration estimation map. In this embodiment, the ECU 10 that performs estimation of the upstream NOx concentration by substituting the load and rotation speed of the internal combustion engine 1 in this upstream NOx concentration estimation map as will be described later constitutes the NOx concentration estimation means according to the present invention.

However, in the internal combustion engine 1, variations in the intake air quantity, intake air temperature, fuel injection quantity, fuel injection timing, bore wall surface temperature in the cylinder etc. may sometimes occur. In addition, there is a possibility that variations of these factors cause variations in the actual upstream NOx concentration. To estimate the degree of deterioration of the NOx catalyst 4 based on the NOx concentration difference with high accuracy, it is important to estimate the upstream NOx concentration with high accuracy.

Figure 2:
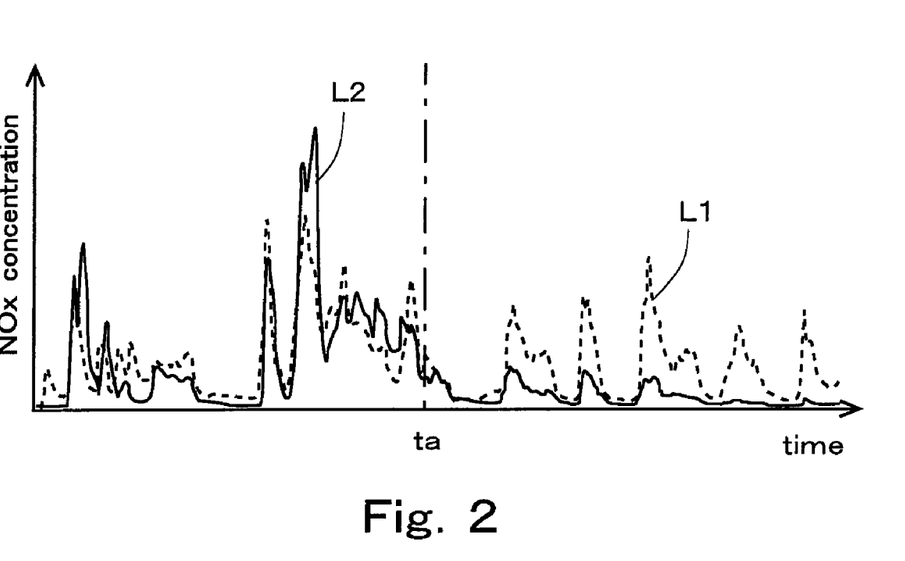
FIG. 2 illustrates changes in the upstream NOx concentration and downstream NOx concentration in cold startup of the internal combustion engine.

Here, changes in the upstream NOx concentration and downstream NOx concentration in cold startup of the internal combustion engine 1 will be described with reference to FIG. 2. In FIG. 2, the vertical axis represents the NOx concentration in the exhaust gas, and the horizontal axis represents the time elapsed after the cold startup of the internal combustion engine 1. The broken curve L1 represents the upstream NOx concentration, and the solid curve L2 represents the downstream NOx concentration.

In FIG. 2, the temperature of the NOx catalyst 4 reaches the activation temperature when time ta has elapsed since the startup. Before time ta elapses after the startup, in other words, when the temperature of the NOx catalyst 4 is lower than the activation temperature, NOx in the exhaust gas is not stored in the NOx catalyst 4, but slips through the NOx catalyst 4. In this case, accordingly, the exhaust gas reaches the NOx sensor 12 with NOx in the exhaust gas not being removed by the NOx catalyst 4. When the temperature of the NOx catalyst 4 reaches the activation temperature, NOx in the exhaust gas is stored in the NOx catalyst 4 and the exhaust gas is purified.

Therefore, during the time period from the startup until time ta has elapsed, the upstream NOx concentration and the downstream NOx concentration have substantially equal values as shown in FIG. 2.

In view of this, in this embodiment, when the NOx catalyst 4 is in an unactivated state, the NOx concentration in the exhaust gas is detected by the NOx sensor 12. In addition, a correction coefficient for correcting the estimation value estimated by the upstream NOx concentration estimation map is calculated based on the difference between the detection value of the NOx sensor 12 and the estimation value of the upstream NOx concentration estimated by the upstream NOx concentration estimation map at that time. (This difference will be hereinafter referred to as the estimation error.)

Estimation of the degree of deterioration of the NOx catalyst 4 is performed at a time when the NOx catalyst 4 is in an activated state. At that time, correction is performed by multiplying the estimation value estimated by the upstream NOx concentration estimation map by the above mentioned correction coefficient. Then, the difference between the estimation value of the upstream NOx concentration after correction and the detection value of the NOx sensor 12 is calculated as the NOx concentration difference, and the degree of deterioration of the NOx catalyst 4 is estimated based on this NOx concentration difference.

According to this embodiment, the upstream NOx concentration can be estimated with improved accuracy, whereby the degree of deterioration of the NOx catalyst 4 can be estimated with improved accuracy.

Furthermore, according to this embodiment, the degree of deterioration of the NOx catalyst 4 can be estimated with improved accuracy without providing an NOx sensor additionally in the exhaust passage 2 upstream of the NOx catalyst 4.

<Correction Coefficient Calculation Routine>

Figure 3:
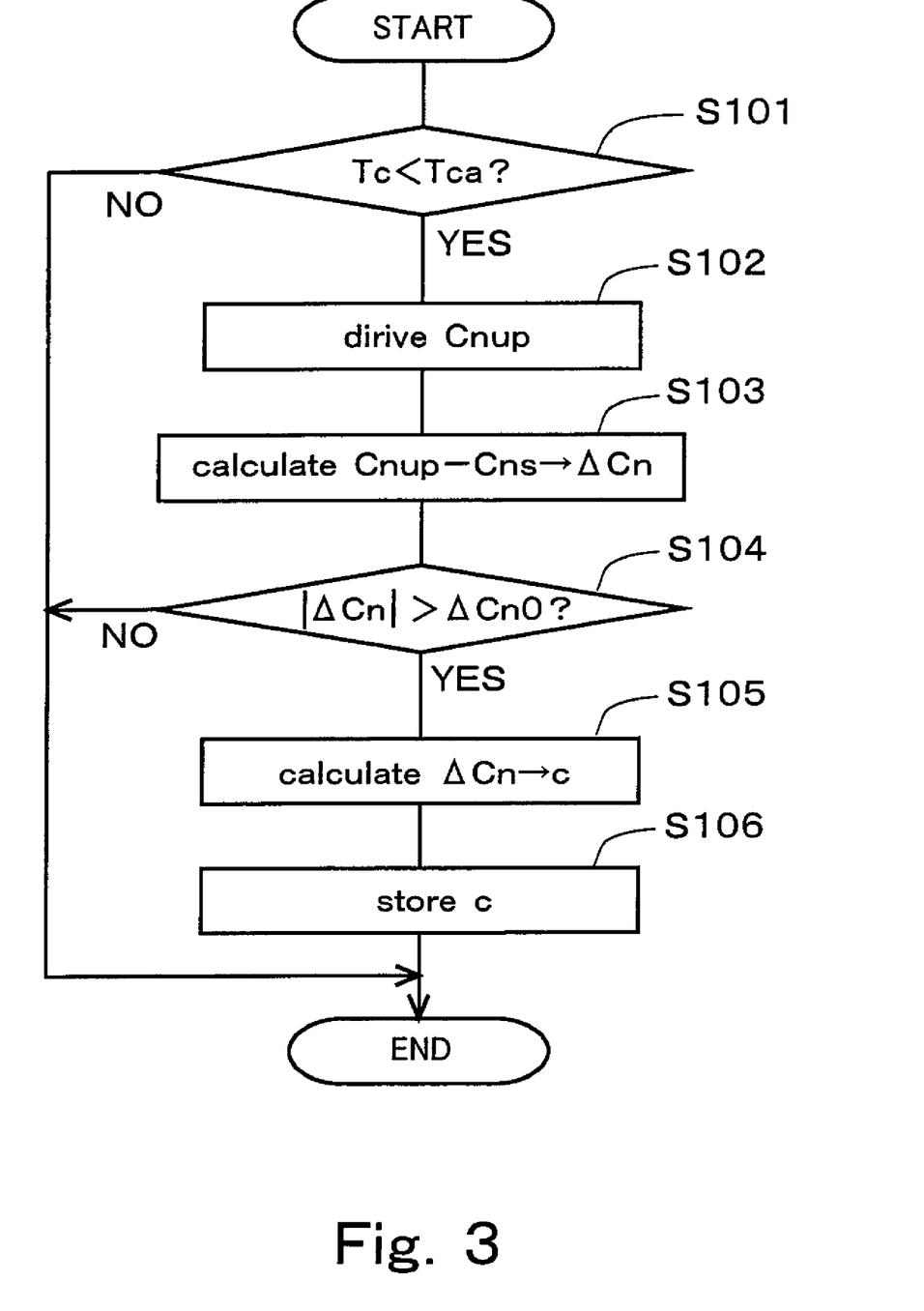
FIG. 3 is a flow chart of a correction coefficient calculation routine according to embodiment 1.

Here, a correction coefficient calculation routine in calculating the aforementioned correction coefficient according to this embodiment will be described with reference to the flow chart shown in FIG. 3. This routine is stored in the ECU 10 in advance, and executed repeatedly at predetermined intervals.

In this routine, first in S101, the ECU 10 determines whether or not the temperature Tc of the NOx catalyst 4 is lower than the lower bound value Tca of activation temperatures. If the determination in S101 is affirmative, the ECU 10 proceeds to step S102, and if the determination is negative, the ECU 10 terminates execution of this routine. In connection with this, in this embodiment, the condition that the temperature Tc of the NOx catalyst 4 is lower than the lower bound value Tca of activation temperatures corresponds to the NOx unremoved condition according to the present invention. In addition, the ECU 10 that executes this step S101 constitutes the NOx unremoved condition determination means according to the present invention.

In S102, the ECU 10 derives the current upstream NOx concentration Cnup based on the upstream NOx concentration estimation map.

Then, the ECU 10 proceeds to S103, where it calculates the estimation error $\Delta Cn$ as the value obtained by subtracting the detection value Cns of the NOx sensor 12 from the upstream NOx concentration Cnup derived in S102.

Then, the ECU 10 proceeds to S104, where it determines whether or not the absolute value of the estimation error $\Delta Cn$ is greater than a predetermined error $\Delta Cn0$. Here, the predetermined error $\Delta Cn0$ is the threshold value that enables to determine that the estimation error $\Delta Cn$ is within an allowable range. If the determination in S104 is affirmative, the ECU 10 proceeds to S105, and if the determination is negative, the ECU 10 terminates execution of this routine.

In S105, the ECU 10 calculates a correction coefficient c for correcting the estimation value of the upstream NOx concentration based on the estimation error $\Delta Cn$. Here, the correction coefficient c is such a value that the absolute value of the value obtained by subtracting the detection value Cns of the NOx sensor 12 from the value obtained by multiplying the upstream NOx concentration Cnup calculated based on the upstream NOx concentration estimation map by the correction coefficient c becomes equal to or smaller than the predetermined error $\Delta Cn0$. In this embodiment, the relationship between the estimation error $\Delta Cn$ and the correction coefficient c may be stored in advance as a map in the ECU 10. Then, the ECU 10 proceeds to S106, where it stores the correction coefficient c. Thereafter, the ECU 10 terminates execution of this routine.

According to the above described routine, in the case where the estimation error $\Delta Cn$ is larger than the predetermined error $\Delta Cn0$ when the NOx catalyst 4 is in an unactivated state, the correction coefficient c is calculated, and the correction coefficient c is stored in the EUC 20.

<Deterioration Degree Calculation Routine>

Figure 4:
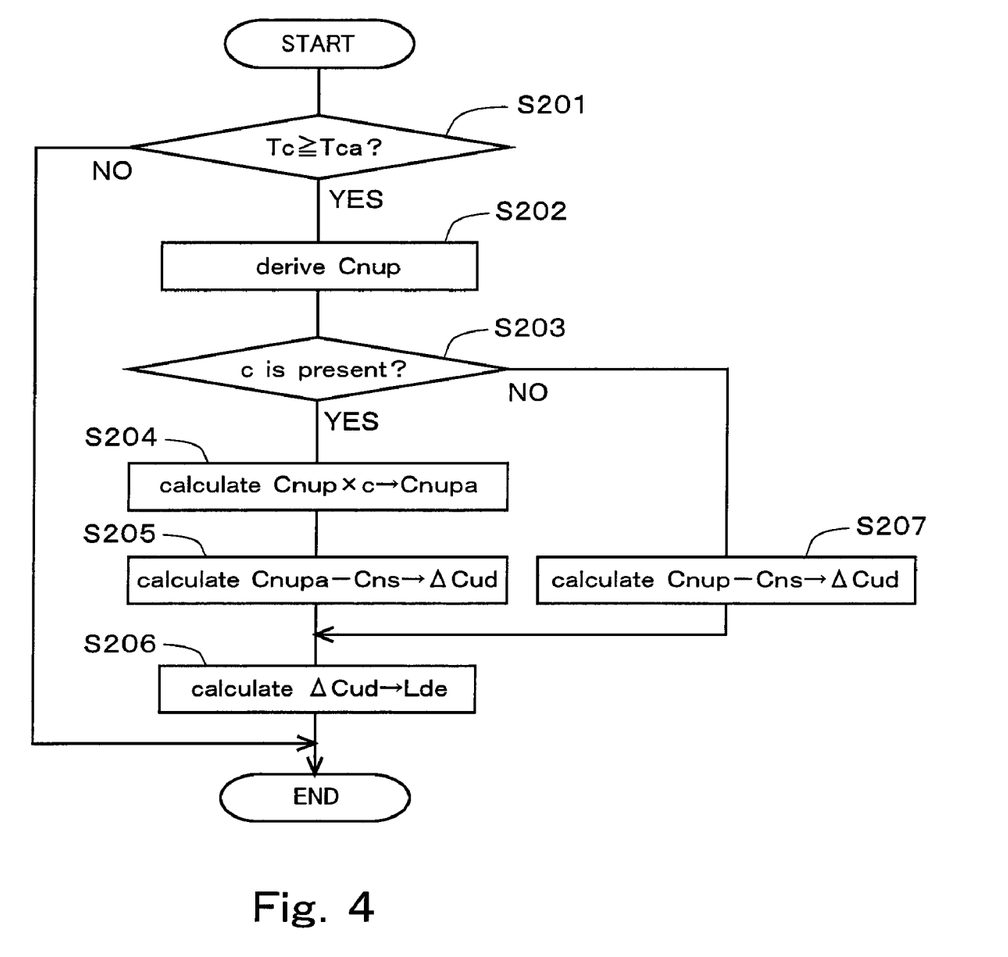
FIG. 4 is a flow chart of a deterioration degree calculation routine according to embodiment 1.

Next, a deterioration degree calculation routine in calculating the degree of deterioration of the NOx catalyst 4 will be described with reference to the flow chart shown in FIG. 4. This routine is stored in the ECU 10 in advance and executed repeatedly at predetermined intervals.

In this routine, first in S201, a determination is made as to whether or not the temperature Tc of the NOx catalyst 4 is equal to or higher than the lower bound value Tca of activation temperatures. If the determination in S201 is affirmative, the ECU 10 proceeds to S202, and the determination is negative, the ECU 10 terminates execution of this routine.

In S202, the ECU 10 derives the current upstream NOx concentration Cnup based on the upstream NOx concentration estimation map.

Then, the ECU 10 proceeds to S203, where it determines whether or not the correction coefficient c is stored. If the correction coefficient c is stored, it may be determined that the estimation error $\Delta Cn$ at the time when the NOx catalyst 4 was in an unactivated state was larger than the predetermined error $\Delta Cn0$. On the other hand, if the correction coefficient c is not stored, it may be determined that the estimation error $\Delta Cn$ at the time when the NOx catalyst 4 was in an unactivated state was equal to or smaller than the predetermined error $\Delta Cn0$. If the determination in S203 is affirmative, the ECU 10 proceeds to S204, and if the determination is negative, the ECU 10 proceeds to S207.

In S204, the ECU 10 calculates a corrected value Cnupa of the upstream NOx concentration by multiplying the upstream NOx concentration Cnup derived in S202 by the correction coefficient c.

Then, the ECU 10 proceeds to S205, where it calculates the NOx concentration difference $\Delta Cud$ by subtracting the detection value Cns of the NOx sensor 12 (i.e. the downstream NOx concentration) from the corrected value Cnupa of the upstream NOx concentration.

Then, the ECU 10 proceeds to S206, where it calculates the degree of deterioration Lde of the NOx catalyst 4 based on the NOx concentration difference ΔCud. Here, the relationship between the NOx concentration difference ΔCud and the deterioration degree Lde of the NOx catalyst 4 may be stored in advance as a map in the ECU 10. Thereafter, the ECU 10 once terminates execution of this routine.

On the other hand, in S207, the ECU 10 calculates the NOx concentration difference ΔCud by subtracting the detection value Cns of the NOx sensor 12 from the upstream NOx concentration Cnup derived in S202. Thereafter, the ECU 10 proceeds to S206.

According to the routine described above, if the estimation error ΔCn at the time when the NOx catalyst 4 was in an unactivated state was larger than the predetermined error ΔCn0, the NOx concentration difference ΔCud is calculated by using the corrected value Cnupa of the upstream NOx concentration. Then, the deterioration degree Lde of the NOx catalyst 4 is estimated based on this NOx concentration difference ΔCud. Therefore, the degree of deterioration of the NOx catalyst 4 can be estimated with improved accuracy.

Embodiment 2

Figure 5:
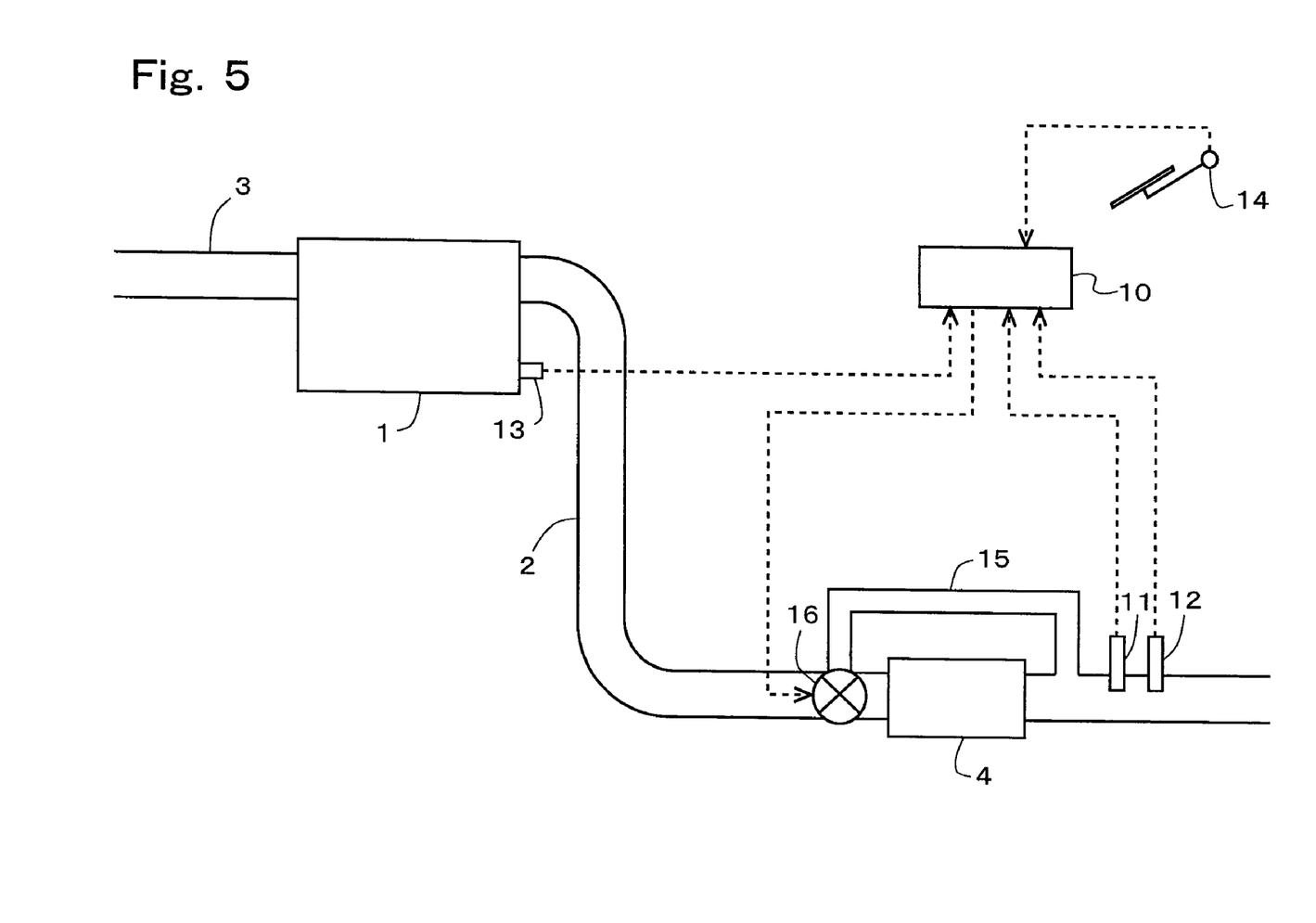
FIG. 5 is a diagram showing the general structure of an air intake and exhaust system of an internal combustion engine according to embodiment 2.

General Structure of Air Intake and Exhaust System of Internal Combustion Engine FIG. 5 is a diagram showing the general structure of the air intake and exhaust system of an internal combustion engine according to this embodiment. In this embodiment, there is provided a bypass passage 15 one end of which is connected to the exhaust passage 2 upstream of the NOx catalyst 4 and the other end of which is connected to the exhaust passage 2 downstream of the NOx catalyst 4 and upstream of the temperature sensor 11 and the NOx sensor 12.

In addition, a flow path switching valve 16 is provided at the connection portion of the exhaust passage 2 with the bypass passage 15 upstream of the NOx catalyst 4. The flow path switching valve 16 switches the flow of the exhaust gas between the flow through the bypass passage 15 and the flow through the NOx catalyst 4. The flow path switching valve 16 is electrically connected with the ECU 10 and controlled by the ECU 10. The structure other than the bypass passage 15 and the flow path switching valve 16 is the same as the general structure of the air intake and exhaust system of the internal combustion engine according to embodiment 1, and like components will be designated by like reference numerals accordingly to omit descriptions thereof. In connection with this, in this embodiment, the flow passage switching valve 16 constitutes the exhaust flow path control means according to the present invention.

<Bypass Control>

In this embodiment, when a predetermined condition is met, the ECU 10 executes a bypass control to close the exhaust passage 2 of the NOx catalyst 4 side and open the bypass passage 15. With execution of the bypass control, the exhaust gas flows while bypassing the NOx catalyst 4.

Here, the predetermined condition may be exemplified by the condition that the temperature of the exhaust gas discharged from the internal combustion engine 1 is lower than the lower bound of activation temperatures of the NOx catalyst 4. In this case, by executing the bypass control, early warming up of the NOx catalyst 4 or controlling of temperature decrease can be expected.

<Calculation of Correction Coefficient>

In this embodiment, when the bypass control is being executed, NOx in the exhaust gas is not removed in the NOx catalyst 4. This means that NOx in the exhaust gas reaches the NOx sensor 12 with NOx not being removed in the NOx catalyst 4 as with the case in which the NOx catalyst 4 is in an unactivated state in embodiment 1. Accordingly, the upstream NOx concentration and the downstream NOx concentration have substantially equal values.

In view of this, in this embodiment, at a time when the bypass control is being executed, the NOx concentration in the exhaust gas is detected by the NOx sensor 12. In addition, the difference between the detection value of the NOx sensor 12 and the estimation value of the upstream NOx concentration estimated by the upstream NOx concentration estimation map at that time is calculated as an estimation error, and a correction coefficient for correcting the estimation value estimated by the upstream NOx concentration estimation map is calculated based on this estimation error. Furthermore, the degree of deterioration of the NOx catalyst 4 is estimated by using this correction coefficient by a method similar to that in embodiment 1.

According to this embodiment, the upstream NOx concentration can be estimated with improved accuracy as with embodiment 1, whereby the degree of deterioration of the NOx catalyst 4 can be estimated with improved accuracy. According to this embodiment also, the degree of deterioration of the NOx catalyst 4 can be estimated with improved accuracy without providing an NOx sensor additionally in the exhaust passage 2 upstream of the NOx catalyst 4.

<Correction Coefficient Calculation Routine>

Figure 6:
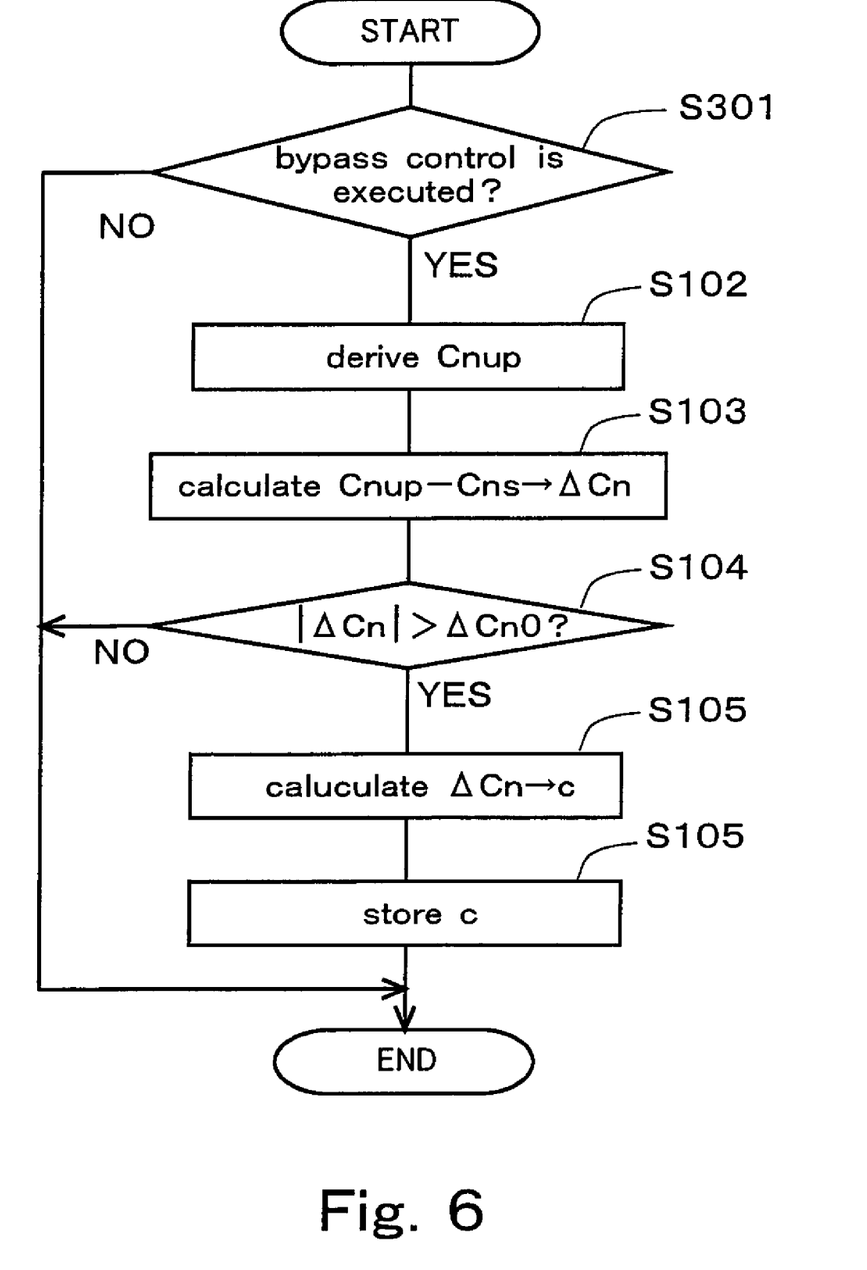
FIG. 6 is a flow chart of a correction coefficient calculation routine according to embodiment 2.

Here, a correction coefficient calculation routine according to this embodiment will be described with reference to the flow chart shown in FIG. 6. This routine differs from the correction coefficient calculation routine shown in FIG. 3 only in that S101 is replaced by S301, and the other steps are the same. This routine is stored in advance in the ECU 10 and executed repeatedly at predetermined intervals.

In this routine, first in S301, a determination is made as to whether or not the bypass control is being executed. If the determination in S301 is affirmative, the ECU 10 proceeds to S102, and if the determination is negative, the ECU terminates execution of this routine. In this embodiment, the condition that the bypass control is being executed constitutes the NOx unremoved condition according to the present invention. In addition, the ECU 10 that executes this step S301 constitutes the NOx unremoved condition determination means according to the present invention.

According to this routine, in the case where the estimation error ΔCn is larger than a predetermined error ΔCn0 when the exhaust gas flows while bypassing the NOx catalyst 4, a correction coefficient c is calculated.

In this embodiment, furthermore, in the case where the estimation error ΔCn at the time when the exhaust gas flows while bypassing the NOx catalyst 4 is larger than the predetermined error ΔCn0, a corrected value Cnupa of the upstream NOx concentration is calculated by multiplying the upstream NOx concentration Cnup by the correction coefficient c. The corrected value Cnupa of the upstream NOx concentration is used in estimating the degree of deterioration of the NOx catalyst 4. The NOx concentration difference ΔCud is calculated by using the corrected value Cnupa of the upstream NOx concentration. Furthermore, the degree of deterioration Lde of the NOx catalyst 4 is estimated based on the NOx concentration difference ΔCud. Therefore, the degree of deterioration of the NOx catalyst 4 can be estimated with improved accuracy.

INDUSTRIAL APPLICABILITY

According to the present invention, in an exhaust gas purification system for an internal combustion engine having an NOx catalyst provided in an exhaust passage, the degree of deterioration of the NOx catalyst can be estimated with improved accuracy.

The invention claimed is:

1. An exhaust gas purification system for an internal combustion engine comprising:
    an NOx catalyst provided in an exhaust passage of an internal combustion engine to remove NOx in exhaust gas;
    an NOx sensor provided in said exhaust passage downstream of said NOx catalyst to detect the NOx concentration in the exhaust gas;
    NOx concentration estimation unit for estimating the NOx concentration in the exhaust gas in said exhaust passage upstream of said NOx catalyst based on an operation state of said internal combustion engine;
    deterioration degree estimation unit for estimating the degree of deterioration of said NOx catalyst based on a difference between a detection value of said NOx sensor and an estimated value by said NOx concentration estimation unit at a time when said NOx catalyst is in an active state and the exhaust gas is flowing through said NOx catalyst; and
    NOx unremoved condition determination unit for determining whether or not an NOx unremoved condition as a condition under which the exhaust gas reaches said NOx sensor with NOx in the exhaust gas not being removed in said NOx catalyst is met,
    wherein the estimated value of the NOx concentration by said NOx concentration estimation unit in estimating the degree of deterioration of said NOx catalyst by said deterioration degree estimation unit is corrected based on the difference between the detection value of said NOx sensor and the estimated value by said NOx concentration estimation unit at a time when it is determined by said NOx unremoved condition determination unit that the NOx unremoved condition is met.

2. An exhaust gas purification system for an internal combustion engine according to claim 1, wherein said NOx unremoved condition determination unit determines that the NOx unremoved condition is met if the temperature of said NOx catalyst is lower than an activation temperature.

3. An exhaust gas purification system for an internal combustion engine according to claim 1 further comprising:
    a bypass passage one end of which is connected to said exhaust passage upstream of said NOx catalyst and the other end of which is connected to said exhaust passage downstream of said NOx catalyst and upstream of said NOx sensor; and
    exhaust gas flow path control unit for performing a control to cause the exhaust gas to flow either through said bypass passage or through said NOx catalyst,
    wherein said NOx unremoved condition determination unit determines that the NOx unremoved condition is met if the exhaust gas is caused by said exhaust gas flow path control unit to flow through said bypass passage.

4. An exhaust gas purification system for an internal combustion engine according to claim 2 further comprising:
    a bypass passage one end of which is connected to said exhaust passage upstream of said NOx catalyst and the other end of which is connected to said exhaust passage downstream of said NOx catalyst and upstream of said NOx sensor; and
    exhaust gas flow path control unit for performing a control to cause the exhaust gas to flow either through said bypass passage or through said NOx catalyst,
    wherein said NOx unremoved condition determination unit determines that the NOx unremoved condition is met if the exhaust gas is caused by said exhaust gas flow path control unit to flow through said bypass passage.

* * * * *